United States Patent [19]

Tsuchiya et al.

[11] 4,155,114
[45] May 15, 1979

[54] TREBLE FREQUENCY CONVERTER

[75] Inventors: Zenkichi Tsuchiya; Fujio Ishikawa, both of Yokohama, Japan

[73] Assignee: Toyo Denki Seizo Kabushiki Kaisha, Tokyo, Japan

[21] Appl. No.: 896,202

[22] Filed: Apr. 13, 1978

[30] Foreign Application Priority Data

Apr. 27, 1977 [JP] Japan .................................. 52-47883

[51] Int. Cl.$^2$ ........................ H02M 5/02; H02K 47/22
[52] U.S. Cl. .................................... 363/157; 363/170; 310/160
[58] Field of Search ............... 363/157, 170, 174, 175, 363/176; 310/160, 169, 170, 171, 257, 263, 129

[56] References Cited

U.S. PATENT DOCUMENTS

| 1,495,030 | 5/1924 | Muller | 310/160 |
| 1,559,295 | 10/1925 | Stoller | 363/170 |
| 1,725,662 | 8/1929 | Merrill | 310/160 |
| 2,761,081 | 8/1956 | Clark | 310/160 X |

Primary Examiner—William M. Shoop
Assistant Examiner—Peter S. Wong
Attorney, Agent, or Firm—Phillips, Moore, Weissenberger, Lempio & Majestic

[57] ABSTRACT

A treble frequency converter comprising a stator and a synchronously rotating rotor. The stator is provided with a primary winding connectable to a polyphase alternating current source and a secondary winding from which treble frequency power can be taken, the secondary winding having three times as many poles as does the primary winding. The rotor has the same number of poles as does the primary winding and the rotor poles are shaped so that the air-gap between the stator and rotor poles will serve to produce third harmonic flux waves effectively and economically.

3 Claims, 4 Drawing Figures

TREBLE FREQUENCY CONVERTER

BACKGROUND OF THE INVENTION (1) Field of the Invention

The present invention relates to a synchronous machine type treble frequency converter for converting a source power to a treble frequency power, i.e., to a power having a frequency three times that of the source.

(2) Description of the Prior Art

Two types of converters for converting a source power to a treble frequency power are known—a static-type frequency converter using semiconductor elements and a rotating machine type frequency converter having a motor-generator principle of operation.

The latter or rotating machine type is normally preferred in the construction field for use in powering small-power high-speed motors.

Conventional rotating machine type frequency converters generally use a motor operated from a power source to drive an alternating current generator. As such two machines, including cores, slip-rings and the like are required.

Synchronous machine-type frequency converters using a single core are also known. Since only a single machine is used, and since slip-rings or the like are not needed, such converters have the advantages of being compact in size, strong in construction and relatively maintenance-free. However, the relatively low efficiency of the known machines has made them undesirably heavy, resulting in higher manufacturing costs.

SUMMARY OF THE INVENTION

The present invention provides a single-core synchronous machine for producing a treble frequency output with high efficiency, thereby minimizing the size, weight and cost of the machine while keeping the maintenance-free advantage of such machines.

More specifically, the efficiency is maximized by shaping the pole surfaces of the rotor core in a manner more fully brought out below such that the most efficient relation of the fundamental and third harmonic components of the space magnetic wave is achieved.

BRIEF DESCRIPTION OF THE DRAWINGS

In the drawings, wherein like parts are designated by like reference numerals throughout the same.

DESCRIPTION OF THE PREFERRED EMBODIMENTS

Figure 1:
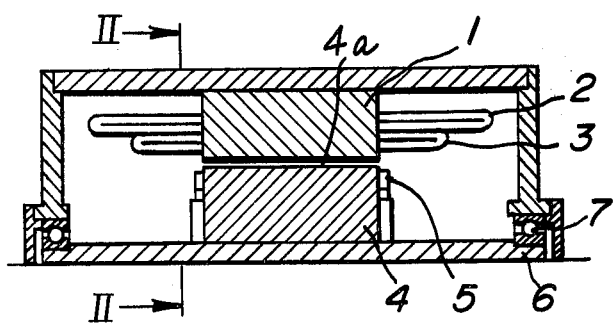
FIGS. 1 and 2 are sectional views of the frequency converter of the present invention, FIG. 1 being a longitudinal section of the upper half portion of the frequency converter and taken on line I—I of FIG. 2, and FIG. 2 being a sectional view of the upper and lower portions of the frequency converter, generally taken on line II—II of FIG. 1.
Figure 2:
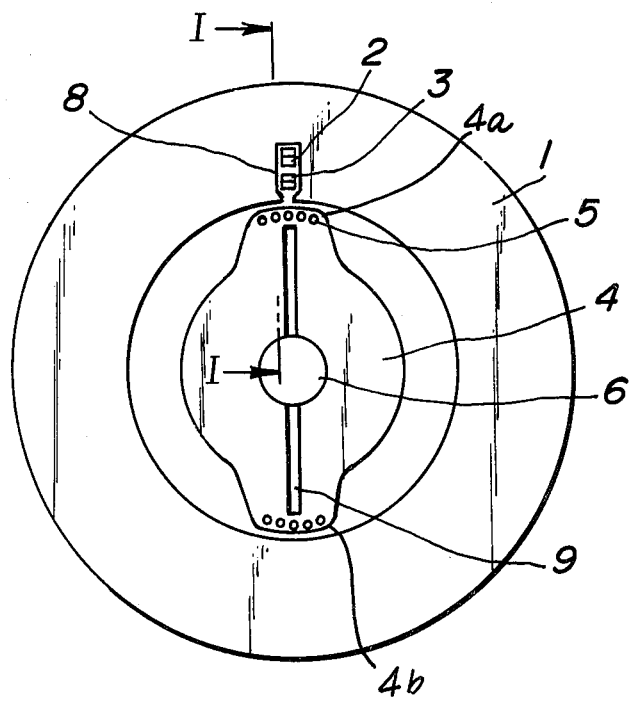

FIGS. 1 and 2 illustrate a reaction type synchronous rotating machine embodying the present invention. Stator 1 has substantially the same configuration as that of a conventional induction or synchronous machine except that two windings 2 and 3 are wound thereon and wound in such manner that the secondary winding 3 has three times the number of poles as does the primary winding 2. In the embodiment disclosed herein, primary winding 2 has two poles and secondary winding 3 has six poles.

Rotor core 4, having pole surfaces 4a and 4b and damper windings 5, is mounted on shaft 6 which is supported by bearings 7 for free rotation about the axis of the shaft.

Reference numeral 8 denotes a slot provided in stator 1 along the air-gap. In order to simplify the drawings, only one of a plurality of such slots 8 is shown in FIG. 2. The rotor is slit, at 9, to increase the magnetic reluctance in the quadrature axis magnetic path.

Figure 3:
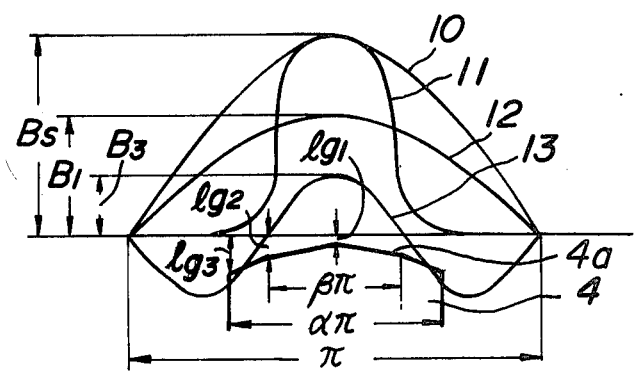
FIG. 3 is a linearly extended view of the air-gap between the stator and one of the rotor poles.

FIG. 3 is a linearly extended view of the air-gap between the stator and rotor and shows a case when the center of the magnetomotive force axis of the primary winding 2 is in coincidence with the center of pole surface 4a or rotor 4. FIG. 3 shows the relation between the magnetomotive force wave 10 along the air-gap produced by primary winding 2 and the space magnetic wave 11 actually produced by the magnetomotive force wave 10. The space magnetic wave 11 includes as components thereof the fundamental magnetic flux wave 12 and the third harmonic magnetic flux wave 13. FIG. 3 also illustrates the shape of the magnetic pole surface 4a of the rotor core 4 for obtaining the space magnetic flux wave 11 having such a particular form as illustrated.

In practice, the space magnetic flux wave 11 may contain more higher harmonic magnetic flux waves other than as illustrated in the figure. However, these higher harmonic magnetic flux waves can be made very small in extent, so that their influence for the generator characteristics may be neglected, by suitably selecting the shape of the magnetic pole surfaces 4a and 4b as to satisfy the conditions which will be described hereinafter. For this reason, the higher harmonic magnetic flux waves other than the third harmonic flux wave are not shown in FIG. 3.

$l_{g1}$, $l_{g2}$, $l_{g3}$ are the air-gap lengths at the center of the magnet pole, at the positions spaced apart from the center of the magnet pole by $\beta\pi/2$ and $\alpha\pi/2$, respectively. Herein, $\beta$ or $\alpha$ denotes ratios of the lengths of pole arc ($\beta\pi$ or $\alpha\pi$) against the pole pitch which is represented by $\pi$.

When the primary winding 2 is connected to a suitable polyphase alternating current source (not shown) the magnetomotive force wave 10 is produced by the primary winding and the space magnetic flux wave 11 is produced in turn. The fundamental magnetic flux wave 12 component included in the space magnetic flux wave 11 functions effectively to operate the frequency converter as a reaction-type synchronous motor.

If it is desired to obtain higher power motor output it is preferable to make the fundamental magnetic flux wave 12 greater. Whereas, if it is desired to make the power of the treble frequency higher, the third higher harmonic magnetic flux wave 13 is to be made greater. However, if the third higher harmonic magnetic flux wave 13 is made too great, then the fundamental magnetic flux wave 12 becomes smaller. This causes lowering of the motor output power, which results in a lowering of the output power of the treble frequency in turn.

The amplitudes $B_s$ of the space magnetic flux wave 11, $B_1$ of the fundamental magnetic flux wave 12 and $B_3$ of the third higher harmonic magnetic flux wave 13 should be decided after making a careful consideration of the above-mentioned overall characteristics.

The shape of the space magnetic flux wave 11 may be controlled by adjusting the air-gap length between the stator and the rotor along the pole arc. This means that the behavior of the space magnetic flux is dependent on the shape of the rotor magnet pole when magnetic saturation of the core is neglected.

With respect to conventional alternating current generators, various efforts have been made to suppress the third harmonic magnetic flux wave. Contrary thereto, in the frequency converter according to the present invention, it is a very important problem how economically to produce the third higher harmonic magnetic flux wave as mentioned above. To this end it is imperative to achieve not only a good generator function but also a good motor function.

As a result of the research and statistical investigations carried out by the inventors, it has been determined that the following condition (1) results in the most economical characteristics.

$$\left.\begin{array}{l} B_1/B_s = 0.6 \sim 0.7 \\ B_3/B_s = 0.4 \sim 0.3 \end{array}\right\} \ldots \text{Condition (1)}$$

The reason why the above condition (1) has a certain range is that the condition should be applied most economically in the design of such an electric machine. In other words, in the design of an electric machine, items of design such as the number of slots 8 in the stator, and the number of turns of the primary and secondary windings may vary stepwise and these items must be taken into account together with the requirement for the voltage regulation grade of the generator, which varies by the nature of load for the generator. Under such circumstances, the above-mentioned condition (1) cannot be made at one point and it has a certain range.

In order to obtain a treble frequency output power efficiently under the above condition (1), the rotor poles should be shaped so that the following condition (2) is satisfied.

$$\left.\begin{array}{l} \alpha = 0.55 \sim 0.42 \\ \beta = 0.36 \sim 0.28 \end{array}\right\} \ldots \text{Condition (2)}$$

In a frequency converter using a reaction-type synchronous rotating machine, the rotor poles should be shaped so that the air-gap between the rotor poles and the stator satisfies the following condition (3).

$$\left.\begin{array}{l} l_{g2}/l_{g1} = 1.5 \sim 2.2 \\ l_{g3}/l_{g1} = 8 \sim 12 \end{array}\right\} \ldots \text{Condition (3)}$$

The above explanation has been mentioned with respect to a reaction-type synchronous rotating machine treble frequency converter.

However, in an ordinary synchronous machine-type frequency converter or in a craw-pole or inductor-type synchronous rotating machine frequency converter wherein a direct current exciting winding is used, the magnetomotive force along the air-gap at the pole arc has a square wave form. Accordingly, in such type of machines, although the condition (2) for satisfying the condition (1) will be the same as in the case of the reaction-type synchronous rotating machine frequency converter, the condition (3) should be replaced by the following condition (4).

$$\left.\begin{array}{l} l_{g2}/l_{g1} = 1.8 \sim 2.5 \\ l_{g3}/l_{g1} = 18 \sim 25 \end{array}\right\} \ldots \text{Condition (4)}$$

The shape of the pole surfaces of the rotor, to produce the variation of air-gap length along the pole arc starting from the center of the pole to the point of $\beta/2$ and the point of $\alpha/2$, is preferably made as a suitable curve for suppressing generation of spurious higher harmonic magnetic flux waves.

The foregoing explanation has been described in a case when the center of the magnetomotive force of the primary winding becomes in coincidence with the center of the rotor pole (termed as direct axis condition). The above situation occurs only in ideal case when the load for the generator is zero. If a definite load is applied to the generator, the center of the rotor pole causes a lag of 0 degree from the center of primary magnetomotive force as shown in FIG. 4.

Figure 4:
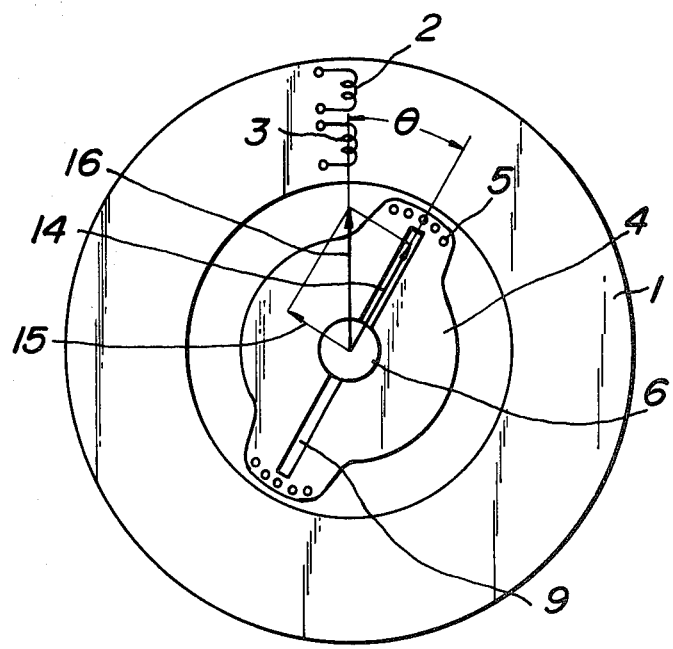
FIG. 4 is a view similar to FIG. 2 when a load is applied to the frequency converter.

Both the primary and the secondary windings are polyphase windings; however in FIG. 4, the drawing illustrates a case where only one of each winding is present on a magnetomotive-force axis.

In such a case when the generator output of the secondary winding is applied to a load, the magnetomotive force 16 produced by the primary winding is divided into a component 14 coincident with the rotor pole (termed as direct axis component) and a component 15 having phase difference of $\frac{1}{2}\pi$ thereto (termed as quadrature axis component). Accordingly, the space magnetic flux waves, fundamental magnetic flux waves, and the third higher harmonic flux waves produced by the magnetomotive force of each component should be taken into account.

However, for the quadrature axis component, as its center becomes in coincidence with a middle point of the rotor poles, the air-gap length becomes very large in the magnetic path and furthermore by provision of slits in the rotor core, the fundamental magnetic flux wave and the third higher harmonic flux wave produced by the quadrature axis component of the magnetomotive force wave 15 can be made very small and is a negligible extent compared with that of the direct axis component. Accordingly, in selecting the shape of the rotor pole, it is sufficient to consider only the direct axis component.

What is claimed is:

1. In a frequency converter of a reaction-type synchronous rotating machine type comprising a stator (1) having a primary polyphase winding (2) and a secondary polyphase winding (3), said secondary winding having a pole number three times that of said primary winding, and a rotor core (4) having a number of salient poles equal to the number of poles of said primary winding, said primary winding being connectable to a polyphase alternating current source so as to operate the frequency converter as a synchronous motor and to derive an output power from said secondary winding, said output power having a frequency treble that of said power source, the improvement wherein:

the poles of said rotor core are shaped to provide that $$\left.\begin{array}{l} B_1/B_s = 0.6 \sim 0.7 \\ B_3/B_s = 0.4 \sim 0.3 \end{array}\right\} \ldots \text{Condition (1)}$$

wherein:

$B_1$ ... amplitude of fundamental magnetic flux wave,
$B_3$ ... amplitude of third harmonic magnetic flux wave,
$B_s$ ... amplitude of space magnetic flux wave
said poles being shaped such that, $$\left. \begin{array}{l} \alpha = 0.55 \sim 0.42 \\ \beta = 0.36 \sim 0.28 \end{array} \right\} \ldots \text{Condition (2)}$$

wherein:
$\alpha$ ... a ratio between the width ($\alpha\pi$) of the salient pole and the pole pitch ($\pi$) of the rotor core,
$\beta$ ... a ratio between the width ($\beta\pi$) between the middle points of the pole and the pole pitch ($\pi$) of the rotor core, and $$\left. \begin{array}{l} l_{g2}/l_{g1} = 1.5 \sim 2.2 \\ l_{g3}/l_{g1} = 8 \sim 12 \end{array} \right\} \ldots \text{Condition (3)}$$

wherein:
$l_{g1}$ ... length of the air-gap at the center of the pole,
$l_{g2}$ ... length of the air-gap at the pole having the width of $\beta\pi$,
$l_{g3}$ ... length of the air-gap at the edge of the pole.

2. In a frequency converter of a craw-pole or inductor type synchronous rotating machine type comprising a stator (1) having a primary polyphase winding (2) and a secondary polyphase winding (3), said secondary winding having a pole number three times that of said primary winding, and a rotor core (4) having a number of salient poles equal to the number of poles of said primary winding, said primary winding being connectable to a polyphase alternating current source so as to operate the frequency converter as a synchronous motor and to derive an output power from said secondary winding, said output power having a frequency treble that of said power source, the improvement wherein:
the poles of said rotor core are shaped to provide that $$\left. \begin{array}{l} B_1/B_s = 0.6 \sim 0.7 \\ B_3/B_s = 0.4 \sim 0.3 \end{array} \right\} \ldots \text{Condition (1)}$$

wherein:
$B_1$ ... amplitude of fundamental magnetic flux wave,
$B_3$ ... amplitude of third harmonic magnetic flux wave,
$B_s$ ... amplitude of space magnetic flux wave,
said poles being shaped such that, $$\left. \begin{array}{l} \alpha = 0.55 \sim 0.42 \\ \beta = 0.36 \sim 0.28 \end{array} \right\} \ldots \text{Condition (2)}$$

wherein:
$\alpha$ ... a ratio between the width ($\alpha\pi$) of the salient pole and the pole pitch ($\pi$) of the rotor core,
$\beta$ ... a ratio between the width ($\beta\pi$) between the middle points of the pole and the pole pitch ($\pi$) of the rotor core, and $$\left. \begin{array}{l} l_{g2}/l_{g1} = 1.8 \sim 2.5 \\ l_{g3}/l_{g1} = 18 \sim 25 \end{array} \right\} \ldots \text{Condition (4)}$$

wherein:
$l_{g1}$ ... length of the air-gap at the center of the pole,
$l_{g2}$ ... length of the air-gap at the pole having the width of $\beta\pi$,
$l_{g3}$ ... length of the air-gap at the edge of the pole.

3. In a frequency converter of an ordinary salient pole type synchronous rotating machine type comprising a stator (1) having a primary polyphase winding (2) and a secondary polyphase winding (3), said secondary winding having a pole number three times that of said primary winding, and a rotor core (4) having a number of salient poles equal to the number of poles of said primary winding, said primary winding being connectable to a polyphase alternating current source so as to operate the frequency converter as a synchronous motor and to derive an output power from said secondary winding, said output power having a frequency treble that of said power source, the improvement wherein:
the poles of said rotor core are shaped to provide that $$\left. \begin{array}{l} B_1/B_s = 0.6 \sim 0.7 \\ B_3/B_s = 0.4 \sim 0.3 \end{array} \right\} \ldots \text{Condition (1)}$$

wherein:
$B_1$ ... amplitude of fundamental magnetic flux wave,
$B_3$ ... amplitude of third harmonic magnetic flux wave,
$B_s$ ... amplitude of space magnetic flux wave,
said poles being shaped such that, $$\left. \begin{array}{l} \alpha = 0.55 \sim 0.42 \\ \beta = 0.36 \sim 0.28 \end{array} \right\} \ldots \text{Condition (2)}$$

wherein:
$\alpha$ ... a ratio between the width ($\alpha\pi$) of the salient pole and the pole pitch ($\pi$) of the rotor core,
$\beta$ ... a ratio between the width ($\beta\pi$) between the middle points of the pole and the pole pitch ($\pi$) of the rotor core, and $$\left. \begin{array}{l} l_{g2}/l_{g1} = 1.8 \sim 2.5 \\ l_{g3}/l_{g1} = 18 \sim 25 \end{array} \right\} \ldots \text{Condition (4)}$$

wherein:
$l_{g1}$ ... length of the air-gap at the center of the pole,
$l_{g2}$ ... length of the air-gap at the pole having the width of $\beta\pi$,
$l_{g3}$ ... length of the air-gap at the edge of the pole.

* * * * *